(12) United States Patent
Akimoto et al.

(10) Patent No.: US 7,117,774 B2
(45) Date of Patent: Oct. 10, 2006

(54) AUTOMATIC LATHE

(75) Inventors: Satoru Akimoto, Koganei (JP);
Eiichiro Someya, Tokorozawa (JP);
Shinsuke Kasahara, Iruma (JP);
Toshio Ishimura, Kawagoe (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 11/113,105

(22) Filed: Apr. 25, 2005

(65) Prior Publication Data

US 2005/0217442 A1 Oct. 6, 2005

Related U.S. Application Data

(62) Division of application No. 10/381,193, filed as application No. PCT/JP00/06535 on Sep. 22, 2000, now Pat. No. 6,928,909.

(51) Int. Cl.
*B23D 3/30* (2006.01)

(52) U.S. Cl. .............................. 82/129; 82/70.2; 82/138

(58) Field of Classification Search .................. 82/129, 82/70.2, 81, 83, 101, 117, 138, 148; 29/35.5, 29/40, 50, 36, 54, 55
See application file for complete search history.

(56) References Cited

U.S. PATENT DOCUMENTS 4,612,832 A * 9/1986 Ushigoe et al. ................ 82/129
5,282,300 A * 2/1994 Girny et al. .................. 29/27 C
5,896,794 A * 4/1999 Trautmann .................... 82/129

FOREIGN PATENT DOCUMENTS

| JP | 6-703 | 11/1994 |
| JP | 7-185901 | 7/1995 |
| JP | 9-323201 | 12/1997 |
| JP | 10-315005 | 12/1998 |

* cited by examiner

*Primary Examiner*—Willmon Fridie, Jr.
(74) *Attorney, Agent, or Firm*—Finnegan, Henderson, Farabow, Garrett & Dunner, L.L.P.

(57) ABSTRACT

An automatic lathe (10) is provided with a first spindle (14) having an axis of rotation (14a), a first tool rest (18) capable of holding a plurality of tools (22) in a parallel arrangement, a second tool rest (20) capable of holding a plurality of tools (22) in parallel arrangements in a first row and second row exhibiting mutually different nose orientations, and a second spindle (16) having an axis of rotation parallel to the axis of rotation of the first spindle and capable of being located facing the first spindle, in such a manner as to be centrally carried on a lathe bed (12). The first spindle can move linearly along a first control axis parallel to its axis of rotation. The first tool rest can move linearly along a second control axis perpendicular to the first control axis. The second tool rest can move linearly along a third control axis perpendicular to the first control axis and a fourth control axis parallel to the first control axis. The second spindle can move linearly along a fifth control axis parallel to the third control axis and a sixth control axis parallel to the first control axis. A control unit (106) enables simultaneous performance of first machining work relating to the first spindle by a desired tool selected at the first tool rest, second machining work relating to the first spindle by a desired tool selected from the first row at the second tool rest, and third machining work relating to the second spindle by a desired tool selected from the second row at the second tool rest.

1 Claim, 14 Drawing Sheets

AUTOMATIC LATHE

This application is a divisional of U.S. application Ser. No. 10/381,193 filed Mar. 21, 2003 now U.S. Pat. No. 6,928,909, which is a §371 of PCT/JP00/06535, filed Sep. 22, 2000, the contents of both of which are incorporated herein by reference.

TECHNICAL FIELD

The present invention relates to a compound machine tool capable of simultaneously or selectively performing different types of automatic machining, in particular a multifunction type automatically operated lathe carrying a plurality of spindles and a plurality of tool rests close together on a single lathe bed.

BACKGROUND ART

In recent years, in the field of automatically operated or automatic lathes such as numerical control (NC) lathes, to enable machining of much more complicatedly shaped workpieces from a bar-shaped worked material (hereinafter called a "bar"), compound or combination machining where a large number of types of tools including rotary tools are provided on a tool rest to enable diverse automatic machining such as milling in addition to turning is being promoted. Further, to shorten the machining time, various multifunction type automatic lathes carrying a plurality of (normally two) spindles and a plurality of (normally two to three) tool rests close together on a single lathe bed and capable of performing different types of machining (for example, outer circumferential turning and boring) simultaneously on the same bar or simultaneous machining on different bars have been proposed.

As this type of multifunction type automatic lathe, for example, there is known one provided with a main (or front) first spindle rotating while holding a bar supplied from outside the lathe, an auxiliary (or back) second spindle rotating while holding a partially machined bar received from the first spindle, and independently operating first and second tool rests equipped with pluralities of tools (for example, see Japanese Unexamined Patent Publication (Kokai) No. 10-315005 (JP10-315005A)). In this known automatic lathe, the first spindle, second spindle, first tool rest, and second tool rest operate along a plurality of independent control axes. Due to this, diverse automatic machining including simultaneous machining is performed.

Explaining this in more detail, the first spindle is configured to move linearly along a feed control axis (here, called the "Z1-axis") parallel to its own axis of rotation. On the other hand, the first tool rest is configured to be located retracted to the side in the front of the first spindle in the axial direction and to move linearly along a feed control axis (here, called the "X1-axis") perpendicular to the Z1-axis of the first spindle. The first tool rest is a so-called combtooth or gang tool rest holding a plurality of tools in a parallel arrangement and can mount a plurality of turning tools (or single point tools) in an arrangement enabling positioning perpendicular to the axis of rotation of the first spindle. Therefore, the first tool rest is capable of moving by interpolation the nose of a desired tool selected by indexing in accordance with an NC program by co-action between X1-axis motion of the first tool rest itself and Z1-axis motion of the first spindle. Due to this, the bar held in the first spindle is machined to the desired shape.

The first tool rest further has a feed control axis (here, called the "Y1-axis") perpendicular to both the Z1-axis and X1-axis. The Y1-axis motion of the first tool rest is motion to index and select the desired tool. Further, the first tool rest may have mounted to it additional tools in a combtooth manner at other positions for selection by X1-axis motion and motion by interpolation by Y1-axis motion.

The second tool rest is located away from the first tool rest in front of the first spindle in the axial direction. The second tool rest is a rocking type tool rest holding a plurality of tools in an arc arrangement centered on a rotation indexing control axis (here, called the "I-axis") parallel to the Z1-axis of the first spindle and can mount at the front holding portion drills or other drilling tools in an arrangement enabling positioning coaxially with the axis of rotation of the first spindle. Therefore, the second tool rest is capable of moving relatively linearly the nose of a desired tool selected by I-axis rotation in accordance with an NC program by Z1-axis motion of the first spindle. Due to this, the bar held in the first spindle is machined to be drilled in its end face.

The second tool rest further is capable of mounting similar drilling tools at a back holding portion at the opposite side to the front holding portion at the same positions as the plurality of tools for machining the bar held in the first spindle, coaxially but oriented in the opposite direction, to enable machining of a bar held in the second spindle. As opposed to this, the second spindle is configured having an axis of rotation parallel to the axis of rotation of the first spindle, located facing it coaxially in front of the first spindle in the axial direction, and moving linearly along a feed control axis (here, called the "Z2-axis") parallel to the Z1-axis of the first spindle. Therefore, the second tool rest can move relatively linearly the nose of a desired tool oriented in the opposite direction in accordance with an NC program by Z2-axis motion of the second spindle. Due to this, end face drilling is performed on the bar held in the second spindle.

In this way, the above known automatic lathe can control the motion of the spindles and tool rests along four feed control axes in accordance with an NC program to simultaneously use as much as three tools selected on the two tool rests to automatically machine bars held at the two or front and back spindles. However, the tools mounted at the second tool rest cannot be moved by interpolation with respect to either bar held in the first and second spindles, so the type of machining able to be performed by the tools of the second tool rest is limited to end face drilling. Further, the tools which can be simultaneously used for the first and second spindles at the second tool rest are limited to a pair of tools mounted coaxially in opposite directions to each other, so the shapes of the holes which can be simultaneously machined inevitably are limited.

As another known multifunction type automatic lathe, there is one where, in addition to the configuration of the first spindle and first tool rest at the four-axis automatic lathe explained above, a second and a third tool rest are provided capable of moving tools by interpolation with respect to two bars held in the first and second spindles. In this multifunction type automatic lathe, the first spindle is configured to move linearly along the Z1-axis in the same way as the above four-axis automatic lathe. Further, the first tool rest is configured to move linearly along the X1-axis and Y1-axis in the same way as the above four-axis automatic lathe.

As opposed to this, the second tool rest is configured located away from the first tool rest in front of the first spindle in the axial direction and to move linearly along a feed control axis (here, called the "X2-axis") perpendicular to the Z1-axis of the first spindle and a feed control axis (here, called the "Z2-axis") parallel to the Z1-axis. The second tool rest is a so-called turret tool rest holding a plurality of tools arranged at equal intervals in the circumferential direction and can mount single point tools, drills, and other turning tools or milling cutters and other rotary tools in an arrangement enabling positioning radially or in parallel with the axis of rotation of the first spindle. Therefore, the second tool rest can move by interpolation the nose of a desired tool selected by indexing in accordance with an NC program by co-action between the X2-axis motion and Z2-axis motion of the second tool rest itself. Due to this, the bar held in the first spindle is machined to a desired shape. Note that the second tool rest has a rotation indexing control axis (here, called the "TI-axis") parallel to the Z2-axis and selects tools by TI-axis rotation.

The second spindle is configured having an axis of rotation parallel to the axis of rotation of the first spindle, arranged to be able to face it in front of the first spindle in the axial direction, and moving linearly along a feed control axis (here, called the "X3-axis") perpendicular to the Z1-axis of the first spindle and a feed control axis (here, called the "Z3-axis") parallel to the Z1-axis. As opposed to this, the third tool rest has a configuration of a gang tool rest holding a plurality of tools in a parallel arrangement, mounts single point tools, drills, and other turning tools or milling cutters and other rotary tools in an arrangement enabling positioning parallel to the axis of rotation of the second spindle, and is located facing the X3-axis path of movement of the second spindle. Therefore, the second spindle can select the desired tool on the third tool rest by its X3-axis motion and move relatively by interpolation the nose of that tool in accordance with an NC program by co-action between the X3-axis motion and Z3-axis motion. Due to this, a bar received from the first spindle is machined to a desired shape.

Further, the first spindle and the second spindle may have rotation angle control axes (here, called the "C1-axis" and "C2-axis"). Therefore, the first and second spindles can use rotary tools mounted at the desired tool rests to perform diverse machining at desired positions on the end faces or outer circumferences of the bars held in them by positioning and indexing motions of the C1-axis and C2-axis.

In this way, the above known automatic lathe can control the motions of the spindles and tool rests along a large number of control axes in accordance with an NC program so as to simultaneously use as much as three tools selected on the three tool rests to automatically machine bars held at the two or front and back spindles. In particular, since it is possible to simultaneously perform individual motion by interpolation instructed for the three tools, there is the advantage that the bars can be machined to complicated shapes in a short time. However, the third tool rest for the second spindle is configured to be stationarily placed on the lathe bed, so to avoid interference between tool rests, the position of machining work by the third tool rest with respect to the second spindle is set to a position sufficiently away from the positions of machining work by the first and second tool rests with respect to the first spindle. As a result, the X3-axis motion of the second spindle becomes relatively large and, together with securing the installation space for the third tool rest, there is a tendency for the overall dimensions of the automatic lathe to increase.

Further, in the above automatic lathe, it is possible to use a special holder to mount tools given orientation to enable machining a bar held in the second spindle at a desired tool mount provided on the turret of the second tool rest. In this case, if mounting tools for machining a bar held in the first spindle given opposite orientations at the same tool mount, it is possible to perform automatic machining by the above three-tool simultaneous interpolation. However, with this configuration, the tools which can be simultaneously used with respect to the first and second spindles in the second tool rest are limited to a pair of tools mounted at the same tool mount on the turret, so the simultaneously machinable shapes are inevitably limited. Further, since the second tool rest is a turret tool rest, the time required for tool selection is longer than a gang tool rest and there is a concern that the effect of shortening the machining time by simultaneous interpolation will end up being canceled out.

DISCLOSURE OF THE INVENTION

Therefore, an object of the present invention is to provide a high performance multifunction type automatic lathe having a plurality of spindles and a plurality of tool rests which is capable of simultaneously performing individual motion by interpolation of desired tools selected at the respective tool rests and further capable of improving the freedom of selection of the tools with respect to bars held in the two spindles to quickly machine the bars to complicated shapes.

Another object of the present invention is to provide a high performance multifunction type automatic lathe capable of multiple tool simultaneous interpolation which is able to eliminate a turret tool rest and thereby efficiently shorten the machining time and able to effectively reduce the overall dimensions of the machine.

To achieve the above objects, the present invention provides an automatically operated lathe comprising a lathe bed; a first spindle installed on the lathe bed and including an axis of rotation; a first tool rest installed on the lathe bed and capable of holding a plurality of tools in a parallel arrangement; a second tool rest installed on the lathe bed and capable of holding a plurality of tools in parallel arrangements in a first row and second row exhibiting mutually different nose orientations; a second spindle installed on the lathe bed, including an axis of rotation parallel to the axis of rotation of the first spindle, and capable of being located facing the first spindle; a first spindle drive mechanism for linearly moving the first spindle along a first control axis parallel to the axis of rotation of the first spindle; a first tool rest drive mechanism for linearly moving the first tool rest along a second control axis perpendicular to the first control axis; a second tool rest drive mechanism for linearly moving the second tool rest along a third control axis perpendicular to the first control axis and a fourth control axis parallel to the first control axis; a second spindle drive mechanism for linearly moving the second spindle along a fifth control axis parallel to the third control axis and a sixth control axis parallel to the first control axis; and a control unit for controlling the first spindle drive mechanism, the first tool rest drive mechanism, the second tool rest drive mechanism, and the second spindle drive mechanism to enable a first machining work in connection with the first spindle by a desired tool selected in the first tool rest, a second machining work in connection with the first spindle by a desired tool selected in the first row of the second tool rest, and a third machining work in connection with the second spindle by a desired tool selected in the second row of the second tool rest to be simultaneously performed.

In a preferred aspect of the present invention, the second tool rest is capable of holding a plurality of tools along the first row and second row oriented toward mutually opposite directions. In this case, it is advantageous that the second tool rest is capable of holding tools in the first row and tools in the second row in a mutually coaxial arrangement.

Further, in a preferred aspect of the present invention, the control unit controls the first spindle drive mechanism, the first tool rest drive mechanism, the second tool rest drive mechanism, and the second spindle drive mechanism to enable a first motion by interpolation of a tool selected in the first tool rest, a second motion by interpolation of a tool selected in the first row of the second tool rest, and a third motion by interpolation of a tool selected in the second row of the second tool rest to be simultaneously performed.

In this case, the control unit may control the second tool rest drive mechanism in a condition where the fourth control axis to which the second tool rest belongs is superposed on the first control axis to which the first spindle belongs.

Further, the control unit may control the second spindle drive mechanism in a condition where the sixth control axis to which the second spindle belongs is superposed on the fourth control axis to which the second tool rest belongs.

Further, the control unit may control the second spindle drive mechanism in a condition where the fifth control axis to which the second spindle belongs is superposed on the third control axis to which the second tool rest belongs.

The first tool rest drive mechanism may linearly move the first tool rest along a seventh control axis perpendicular to both the first control axis and the second control axis.

In this case, it is advantageous that the first tool rest is capable of holding a plurality of tools in a parallel arrangement along an axial direction of the seventh control axis and is capable of positioning noses of the tools at a plurality of locations shifted from each other in a tool longitudinal direction.

Further, it is advantageous that the first tool rest includes a first holding portion capable of holding a plurality of tools in a parallel arrangement along an axial direction of the seventh control axis and a second holding portion capable of holding a plurality of tools in a parallel arrangement along an axial direction of the second control axis.

The first tool rest may be provided with a recess for avoiding contact with a plurality of tools disposed in the first row of the second tool rest.

In a preferred aspect of the present invention, the lathe further comprises a guide bush installed on the lathe bed for centering and supporting a bar held in the first spindle in front of the first spindle.

The present invention further provides an automatically operated lathe comprising a lathe bed; a first spindle installed on the lathe bed, including a first axis of rotation, and movable in an axial direction of the first axis of rotation; a first tool rest installed on the lathe bed, capable of holding a plurality of tools in a parallel arrangement, and movable in a direction perpendicular to the first axis of rotation; a second tool rest installed on the lathe bed, capable of holding a plurality of tools in parallel arrangements along a first row and second row exhibiting mutually different nose orientations, and movable in an axial direction of the first axis of rotation and a direction perpendicular to the first axis of rotation; and a second spindle installed on the lathe bed, including a second axis of rotation parallel to the first axis of rotation, capable of being located facing the first spindle, and movable in an axial direction of the second axis of rotation and a direction perpendicular to the second axis of rotation; wherein the first spindle, the first tool rest, the second tool rest, and the second spindle are selectively moved in movable directions thereof to machine different materials held in the first spindle and the second spindle.

BRIEF DESCRIPTION OF THE DRAWINGS

These and other objects, features, and advantages of the present invention will become clearer from the following description of the preferred embodiments given with reference to the attached drawings. In the attached drawings.

BEST MODE FOR CARRYING OUT THE INVENTION

Figure 1:
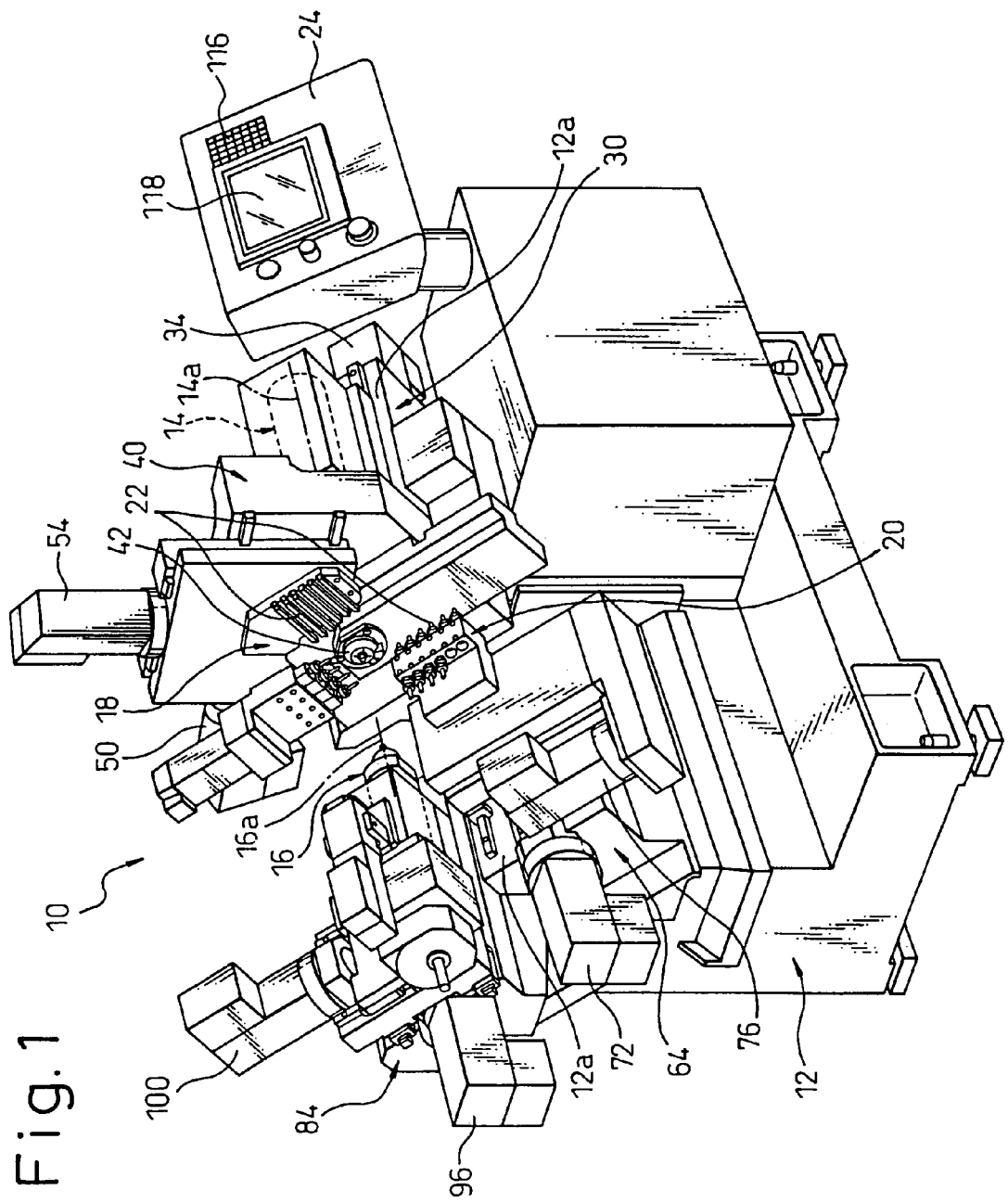
FIG. 1 is a perspective view of the overall configuration of an automatic lathe according to an embodiment of the present invention.

Referring to the drawings, FIG. 1 shows the overall configuration of an automatically operated or automatic lathe 10 according to an embodiment of the present invention. The automatic lathe 10 has a multifunction structure carrying close together on a single lathe bed 12 two spindles 14 and 16 and two tool rests 18 and 28 and capable of performing different types of machining (for example, outer circumferential turning and boring) simultaneously on the same bar or simultaneous machining on different bars by various tools 22 including single point tools, drills, and other turning tools or milling cutters and other rotary tools.

That is, the automatic lathe 10 is provided with a lathe bed 12; a first spindle 14 installed on the lathe bed 12 and including an axis of rotation 14a; a first tool rest 18 installed on the lathe bed 12 and capable of holding a plurality of tools 22 in a parallel arrangement; a second tool rest 20 installed on the lathe bed 12 and capable of holding a plurality of tools 22 in parallel arrangements along a first row and second row exhibiting mutually different nose orientations; and a second spindle 16 installed on the lathe bed 12, including an axis of rotation 16a parallel to the axis of rotation 14a of the first spindle 14, and capable of being located facing the first spindle 14.

The lathe bed 12 has a so-called slant bed structure having a slanted guide surface 12a at the front of the bed and carries the first spindle 14, second spindle 16, first tool rest 18, and second tool rest 20 independently from each other to be able to slide in three rectangular coordinate systems based on the slanted guide surface 12a explained later. The lathe bed 12 further carries a control panel 24 for operating a later explained control unit, a not shown cover, etc.

Figure 2:
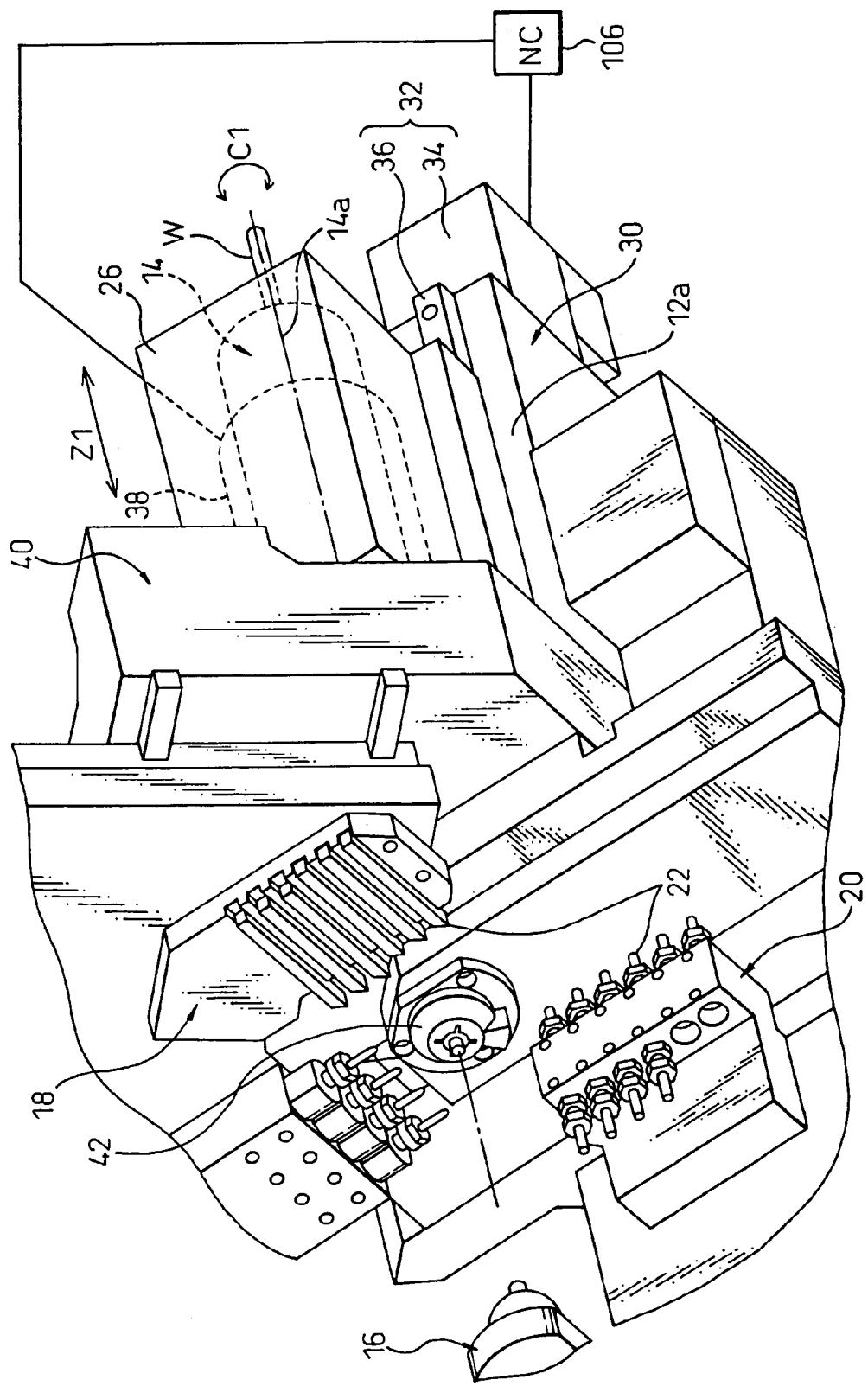
FIG. 2 is an enlarged perspective view of a first spindle of the automatic lathe of FIG. 1.

As shown enlarged in FIG. 2, the first spindle 14 is a main (or front) spindle rotating while holding a bar W supplied from outside the lathe and has rotatably built into it a first spindle stock 26 through a not shown bearing unit. The first spindle 14 has a hollow cylindrical structure and is provided at its front end region with a chuck (for example, a collet chuck) 28 (FIG. 9) able to strongly hold the bar W supplied from the rear end side.

The first spindle stock 26 is slidably carried at a first spindle mount 30 provided at one end region of the lathe bed 12 in the longitudinal direction. The first spindle mount 30 is provided with a first spindle drive mechanism 32 for linearly moving the first spindle stock 26 along a first feed control axis (called the "Z1-axis") parallel to the slanted guide surface 12a and the axis of rotation 14a of the first spindle 14 in a rectangular three-axis coordinate system based on the slanted guide surface 12a of the lathe bed 12. The first spindle drive mechanism 32 is comprised of a Z1-drive (for example, an AC servomotor) 34 attached to the lathe bed 12, a Z1-guide member (for example, a slide guide) 36 attached to the slanted guide surface 12a, and a not shown feed screw (for example, a ball screw). The output side of the Z1-drive 34 has a screw shaft of the feed screw connected to it, while the first spindle stock 26 has a nut of the feed screw connected to it. Therefore, the first spindle 14 can move linearly reciprocatively together with the first spindle stock 26 along the first feed control axis (Z1-axis) parallel to its own axis of rotation 14a by the action of the first spindle drive mechanism 32.

The first spindle stock 26 further includes for example a built-in type AC servomotor as a rotation drive 38 for driving rotation of the first spindle 14. Further, the first spindle 14 can have a rotation angle control axis (called the "C1-axis") and can perform diverse machining using the rotary tools mounted at the desired tool rests 18 and 20, at desired positions on the end face or outer circumference of the bar W held in the chuck 28, by a positioning indexing motion of the C1-axis obtained by control of the rotation drive 38.

At the approximate center of the lathe bed 12 in the longitudinal direction is uprightly provided a column 40 adjacent to the first spindle mount 30. The column 40 is provided at a predetermined position away from the first spindle stock 26 in the front in the axial direction with a guide bush 42 serving as an auxiliary support supporting the bar w held in the first spindle 14 near the machined portion at its tip. The guide bush 42 is arranged coaxially with the first spindle 14 and centers and supports the bar W during turning so that the machined portion does not shake. The guide bush 42 has a known structure of either a fixed type guide bush or a rotating type guide bush.

Figure 3:
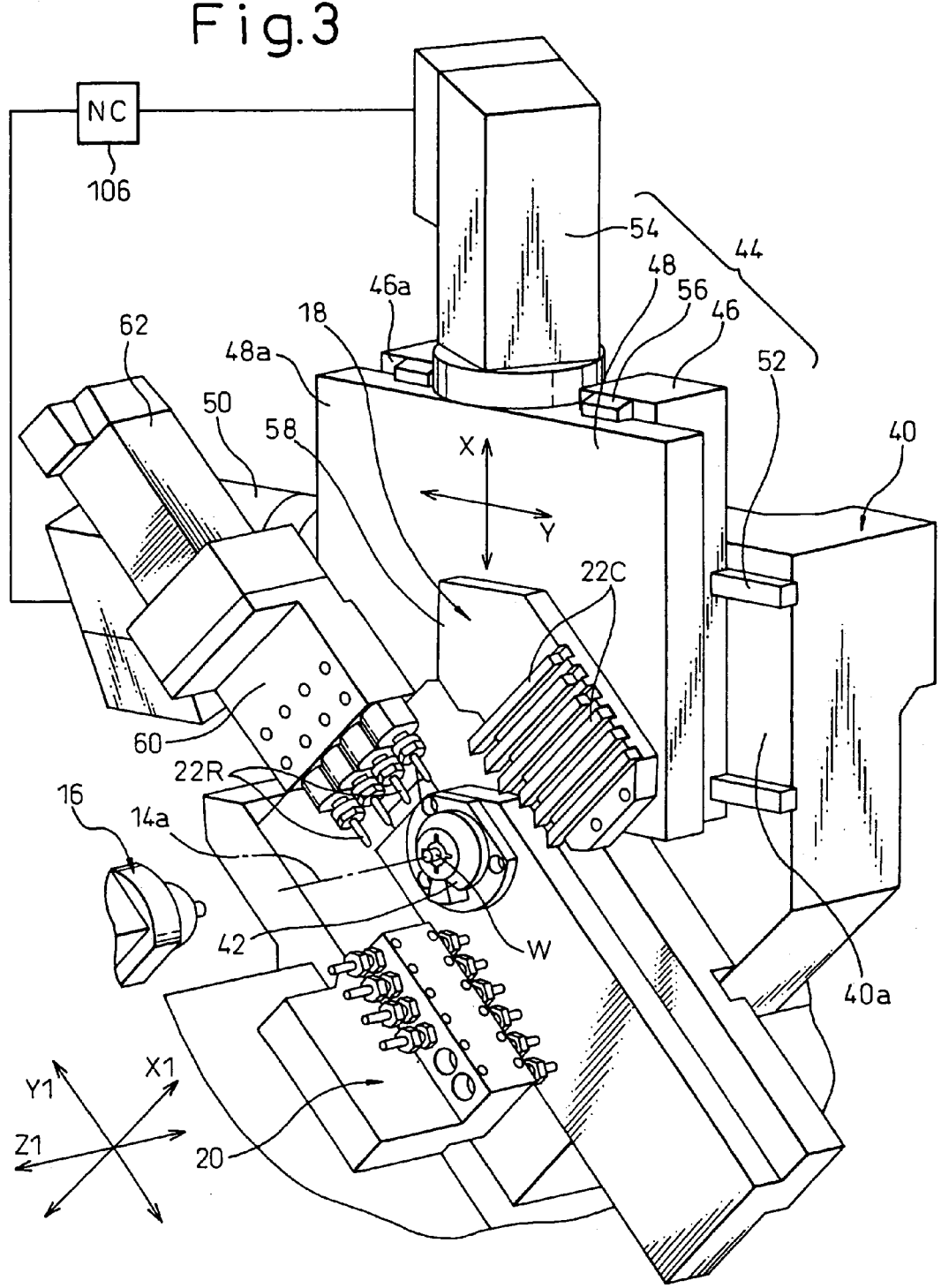
FIG. 3 is an enlarged perspective view of a first tool rest of the automatic lathe of FIG. 1.

As shown enlarged in FIG. 3, the first tool rest 18 is carried on the lathe bed 12 movable along the front surface 40a of the column 40 functioning as the first tool rest mount and is arranged retracted to the side of the guide bush 42 positioned in front of the first spindle 14 in the axial direction. The column 40 is provided with a first tool rest drive mechanism 44 for linearly moving the first tool rest 18 along a second feed control axis (called the "X1-axis") perpendicular to the slanted guide surface 12a and the axis of rotation 14a (that is, the first feed control axis (Z1-axis)) of the first spindle 14 in a rectangular three-axis coordinate system based on the slanted guide surface 12a of the lathe bed 12.

The first tool rest drive mechanism 44 is provided with a Y-slide 46 carried on the front surface 40a of the column 40 perpendicular to the slanted guide surface 12a of the lathe bed 12 slidably in the actual horizontal feed control axis (called the "Y-axis") direction perpendicular to the first feed control axis (Z1-axis), an Y-slide drive mechanism for moving the Y-slide 46 on the column 40 in the Y-axis direction, an X-slide 48 carried at the front surface 46a of the Y-slide 46 parallel to the front surface 40a of the column 40 slidably in the actual vertical feed control axis (called the "X-axis") direction perpendicular to both the first feed control axis (Z1-axis) and actual horizontal feed control axis (Y-axis), and an X-slide drive mechanism for moving the X-slide 48 on the Y-slide 46 in the X-axis direction. The Y-slide drive mechanism is comprised of a Y-drive (for example, an AC servomotor) 50 attached to the column 40, a Y-guide member (for example, a slide guide) 52 attached to the column front surface 40a, and a not shown feed screw (for example, a ball screw). The output side of the Y-drive 50 has a screw shaft of the feed screw connected to it, while the Y-slide 46 has a nut of the feed screw connected to it. Similarly, the X-slide drive mechanism is comprised of an X-drive (for example, an AC servomotor) 54 attached to the Y-slide 46, an X-guide member (for example, a slide guide) 56 attached to the Y-slide front surface 46a, and a not shown feed screw (for example, a ball screw). The output side of the X-drive 54 has a screw shaft of the feed screw connected to it, while the X-slide 48 has a nut of the feed screw connected to it. Therefore, the first tool rest 18 can move linearly reciprocatively along the second feed control axis (X1-axis) perpendicular to the first feed control axis (Z1-axis) by linear motion by interpolation by the Y-axis motion of the Y-slide 46 and X-axis motion of the X-slide 48 under the action of the first tool rest drive mechanism 44.

The first tool rest drive mechanism 44 linearly moves the first tool rest 18 further along a feed control axis (called the "Y1-axis") perpendicular to both of the first and second feed control axes (Z1-axis and X1-axis) in the rectangular three-axis coordinate system based on the slanted guide surface 12a of the lathe bed 12. This feed control axis (Y1-axis), like the second feed control axis (X1-axis), is realized by linear motion by interpolation by the Y-axis motion of the Y-slide 46 and X-axis motion of the X-slide 48 under the action of the first tool rest drive mechanism 44. Due to this, the first tool rest 18 can linearly and reciprocatively move along the Y1-axis.

The first tool rest 18 is a so-called combtooth or gang tool rest holding a plurality of tools 22 in a parallel arrangement and mounts single point tools, drills, and other turning tools or milling cutters and other rotary tools in an arrangement enabling positioning along a virtual plane parallel to the front surface 40a of the column 40 and radially with respect to the axis of rotation 14a of the first spindle 14. In the illustrated embodiment, the first tool rest 18 is configured having a first holding portion 58 capable of holding a plurality of tools 22 (in the figure, single point tools 22C) in a parallel arrangement in a direction perpendicular to the second feed control axis (X1-axis), that is, in the Y1-axis direction, and a second holding portion 60 near the first holding portion 58 capable of holding a plurality of tools 22 (in the figure, milling cutters, drills, and other rotary tools 22R) in a parallel arrangement in the second feed control axis (X1-axis) direction. In the figure, the first holding portion 58 and second holding portion 60 are individually secured to the front surface 48*a* of the X-slide 48 as independent members. Alternatively, the two holding portions 58 and 60 can be integrally connected with each other. The second holder 60 can be provided with a drive (for example, an AC servomotor) 62 of the rotary tools 22R.

Therefore, the first tool rest 18 is capable of moving by interpolation the nose of a desired tool 22, selected by indexing from the first holding portion 58 by Y1-axis motion, by co-action of X1-axis motion of the first tool rest 18 itself and the aforementioned Z1-axis motion of the first spindle 14 in accordance with an NC program or other machining program. Similarly, the first tool rest 18 is capable of moving by interpolation the nose of a desired tool 22, selected by indexing from the second holding portion 60 by X1-axis motion, by co-action of Y1-axis motion of the first tool rest 18 itself and Z1-axis motion of the first spindle 14 in accordance with an NC program or other machining program. Further, the first tool rest 18 is capable of moving by interpolation the nose of a rotary tool 22R mounted at the second holding portion 60, by co-action between X1-axis motion and Y1-axis motion of the first tool rest 18 itself in accordance with an NC program or other machining program. In this way, the bar W held in the first spindle 14 can be machined to a desired shape by a desired tool 22 on the first tool rest 18.

Note that when for example selecting a milling cutter as the rotary tool 22R from the second holding portion 60 of the first tool rest 18, it is possible to cut the outer circumference of the bar W to a flat shape (that is, a D-cut) by X1-axis motion of the first tool rest 18 or cut a groove parallel to the Z-axis in the outer circumference of the bar w by Y1-axis motion of the first tool rest 18 and Z1-axis motion of the first spindle 14. Further, when selecting a drill as the rotary tool 22R from the second holder 60, it is possible to drill a hole in the outer circumference of the bar W by Y1-axis motion of the first tool rest 18.

Figure 4:
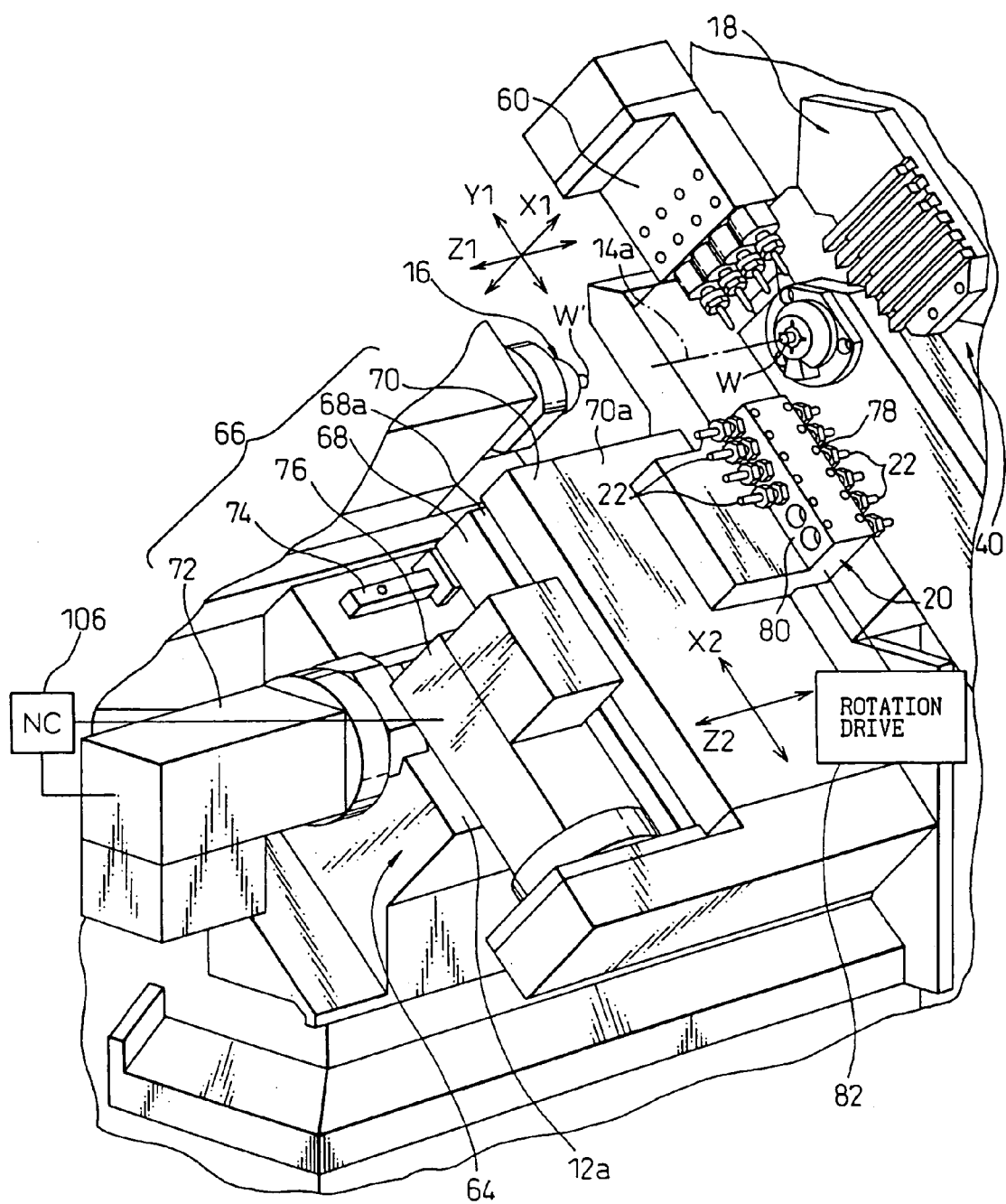
FIG. 4 is an enlarged perspective view of a second tool rest of the automatic lathe of FIG. 1.

As shown in FIG. 1, the second tool rest 20 is carried on the lathe bed 12 movably on a second tool rest mount 64 provided at the opposite side to the first spindle mount 30 across the column 40. As shown enlarged in FIG. 4, the second tool rest mount 64 is provided with a second tool rest drive mechanism 66 for linearly moving the second tool rest 20 along a third feed control axis (called the "X2-axis") parallel to the slanted guide surface 12*a* and perpendicular to the axis of rotation 14*a* (that is, the first feed control axis (Z1)) of the first spindle 14 and a fourth feed control axis (called the "Z2-axis") parallel to the first feed control axis (Z1-axis) in a rectangular two-axis coordinate system based on the slanted guide surface 12*a* of the lathe bed 12.

The second tool rest drive mechanism 66 is provided with a Z2-slide 68 carried on the slanted guide surface 12*a* of the lathe bed 12 slidably in the fourth feed control axis (Z2-axis) direction, a Z2-slide drive mechanism for moving the Z2-slide 68 in the Z2-axis direction on the lathe bed 12, an X2-slide 70 carried on the front surface 68*a* of the Z2-slide 68 parallel to the slanted guide surface 12*a* slidably in the third feed control axis (X2-axis) direction, and an X2-slide drive mechanism for moving the X2-slide 70 on the Z2-slide 68 in the X2-axis direction. The Z2-slide drive mechanism is comprised of a Z2-drive (for example, an AC servomotor) 72 attached to the lathe bed 12, a Z2-guide member (for example, a slide guide) 74 attached to the slanted guide surface 12*a*, and a not shown feed screw (for example, a ball screw). The output side of the Z2-drive 72 has the screw shaft of the feed screw connected to it, while the Z2-slide 68 has the nut of the feed screw connected to it. Similarly, the X2-slide drive mechanism is comprised of an X2-drive (for example, an AC servomotor) 76 attached to the Z2-slide 68, a not shown X2-guide member (for example, a slide guide) attached to the Z2-slide front surface 68*a*, and a not shown feed screw (for example, a ball screw). The output side of the X2-drive 76 has the screw shaft of the feed screw connected to it, while the X2-slide 70 has the nut of the feed screw connected to it. Therefore, the second tool rest 20 can move linearly and reciprocatively along the third feed control axis (X2-axis) and fourth feed control axis (Z2-axis) by the action of the second tool rest drive mechanism 66.

The second tool rest 20 is capable of holding a plurality of tools 22 in a combtooth manner in a first row and a second row, exhibiting mutually different nose orientations, and can mount single point tools, drills, and other turning tools or milling cutters and other rotary tools in an arrangement enabling positioning along a virtual plane parallel to the slanted guide surface 12*a* of the lathe bed 12 in parallel or coaxially with the axis of rotation 14*a* of the first spindle 14. In the illustrated embodiment, the second tool rest 20 is comprised of a first holding portion 78 capable of orienting the plurality of tools 22 to face the column 40 carrying the first tool rest 16 and arranging them in parallel in the direction of the third feed control axis (X2-axis) to hold them in the first row, and a second holding portion 80, opposite to the first holding portion 78, capable of holding a plurality of tools 22 in the second row at the same positions as the plurality of tools 22 mounted at the first holding portion 78 oriented coaxially but in opposite directions. The tools 22 of the first row mounted at the first holding portion 78 of the second tool rest 20 have nose orientations for machining the bar W held in the first spindle 14. On the other hand, the tools 22 of the second row mounted at the second holding portion 80 of the second tool rest 20 have nose orientations for machining the bar W' held in the second spindle 16.

Note that preferably the second tool rest 20 is secured to the front surface 70*a* of the X2-slide 70 in the state with the first holding portion 78 sticking out to the column 40 side as illustrated. Due to this, it is possible to avoid mutual interference between the X2-slide 70 and the first tool rest 18 (in particular the second holding portion 60) when machining a bar W held in the first spindle 20 by the tools 22 mounted at the first holding portion 78 of the second tool rest 20. Further, the second tool rest 20 may mount a rotary tool having a built in or attached small-sized electric motor, air motor, or other rotation drive 82.

Therefore, the second tool rest 20 is capable of moving by interpolation the nose of a desired tool 22, selected by indexing from the first holding portion 78 by its own X2-axis motion, by co-action of X2-axis motion and Z2-axis motion of the second tool rest 20 itself according to an NC program or other machining program. Further, it is capable of moving the nose by superposing Z2-axis motion of the second tool rest 20 itself on Z1-axis motion of the first spindle 14 in accordance with an NC program or other machining program. In this way, it is possible to machine a bar W held in the first spindle 14 to a desired shape by a desired tool 22 selected from the first row of the second tool rest 20. Note that when selecting a single point tool from the first holding portion 78 of the second tool rest 20 for example, it is possible to turn the outer circumference of the bar W or bore or form a ring groove in the end face of the bar W, by X2-axis motion of the second tool rest 20. Further, when selecting a rotary tool (for example, milling cutter) from the first holding portion 78, it is possible to perform various machining on the end face of the bar W by Z2-axis motion and X2-axis motion of the second tool rest 20.

As shown in FIG. 1, the second spindle 16 is carried on the lathe bed 12 movably on a second spindle mount 84 provided adjacent to the second tool rest mount 64 at the opposite side to the first spindle mount 30 across the column 40, has an axis of rotation 16a parallel to the axis of rotation 14a of the first spindle 14, and is located to be able to face coaxially the first spindle 14, that is, the guide bush 42, in front in the axial direction. The second spindle 16 is an auxiliary (or back) spindle rotating while holding a partially machined bar W' received from the first spindle 14 and is rotatably built into a second spindle stock 86 through a not shown bearing device. The second spindle 16 has a hollow cylindrical structure and is provided at its front end region with a chuck (for example, a collet chuck) 88 (FIG. 9) able to strongly hold the bar W' supplied from the facing guide bush 42.

Figure 5:
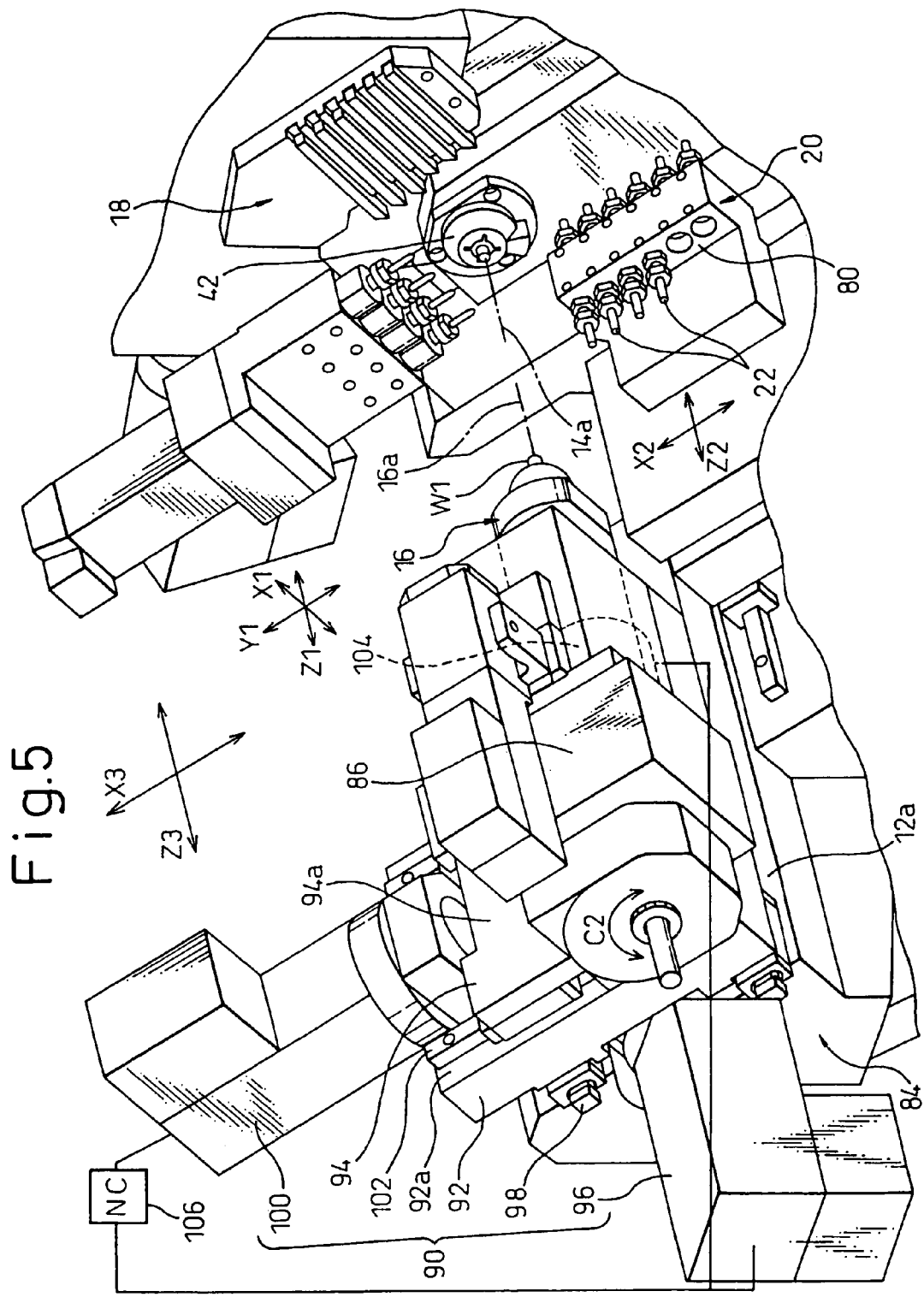
FIG. 5 is an enlarged perspective view of a second spindle of the automatic lathe of FIG. 1.

As shown enlarged in FIG. 5, the second spindle mount 84 is provided with a second spindle drive mechanism 90 for linearly moving the second spindle 16 along a fifth feed control axis (called the "X3-axis") parallel to the third feed control axis (X2-axis) of the second tool rest 20 and a sixth feed control axis (called the "Z3-axis") parallel to the first feed control axis (Z1-axis) of the first spindle 14 in a rectangular two-axis coordinate system based on the slanted guide surface 12a of the lathe bed 12.

The second spindle drive mechanism 90 is comprised of a Z3-slide 92 carried on the slanted guide surface 12a of the lathe bed 12 slidably in the sixth feed control axis (Z3-axis) direction, a Z3-slide drive mechanism for moving the Z3-slide 92 in the Z3-axis direction on the lathe bed 12, an X3-slide 94 carried on the front surface 92a of the Z3-slide 92 parallel to the slanted guide surface 12a slidably in the fifth feed control axis (X3-axis) direction, and an X3-slide drive mechanism for moving the X3-slide 94 on the Z3-slide 92 in the X3-axis direction. The Z3-slide drive mechanism is comprised of a Z3-drive (for example, an AC servomotor) 96 attached to the lathe bed 12, a Z3-guide member (for example, a slide guide) 98 attached to the slanted guide surface 12a, and a not shown feed screw (for example, a ball screw). The output side of the Z3-drive 96 has a screw shaft of the feed screw connected to it, while the Z3-slide 92 has a nut of the feed screw connected to it. Similarly, the X3-slide drive mechanism is comprised of an X3-drive (for example, an AC servomotor) 100 attached to the Z3-slide 92, an X3-guide member (for example, a slide guide) 102 attached to the Z3-slide front surface 92a, and a not shown feed screw (for example, a ball screw). The output side of the X3-drive 100 has a screw shaft of the feed screw connected to it, while the X3-slide 94 has a nut of the feed screw connected to it.

The second spindle stock 86 is secured to the front surface 94a of the X3-slide 94 in a state with the axis of rotation 16a of the second spindle 16 arranged in parallel to the sixth feed control axis (Z3-axis). Therefore, the second spindle 16 can move linearly and reciprocatively along the fifth feed control axis (X3-axis) and sixth feed control axis (Z3-axis) by the action of the second spindle drive mechanism 90.

The second spindle stock 86 further includes for example a built-in type AC servomotor as a rotation drive 104 for driving rotation of the second spindle 16. Further, the second spindle 16 can have a rotation angle control axis (called the "C2-axis") and can perform diverse machining using a desired rotary tool mounted to the second tool rest 20 at a desired position on the end face or outer circumference of the bar W' held in the chuck 88 by a positioning indexing motion of the C2-axis obtained by control of the rotation drive 104.

In this way, the second spindle 16 can move linearly along the fifth feed control axis (X3-axis) parallel to the third feed control axis (X2-axis) of the second tool rest 20. Therefore, the second tool rest 20 can select by indexing the desired tool 22 from the tools 22 of the second row mounted at the second holding portion 80 by at least one of its own X2-axis motion and X3-axis motion of the second spindle 16. Further, the second tool rest 20 can relatively move by interpolation the nose of the desired tool 22 as selected, by co-action of X3-axis motion and Z3-axis motion of the second spindle 16 in accordance with an NC program or other machining program and also can move the nose by superposing Z3-axis motion of the second spindle 16 on Z2-axis motion of the second tool rest 20 itself in accordance with an NC program or other machining program. In this way, it is possible to machine a bar W' held in the second spindle 16 to a desired shape by a desired tool 22 selected from the second row on the second tool rest 20. Note that when selecting a single point tool from the second holding portion 80 of the second tool rest 20 for example, it is possible to turn the outer circumference of the bar W or drill or form a ring groove in the end face of the bar W, by X3-axis motion of the second spindle 16 superposed on X2-axis motion of the second tool rest 20. Further, when selecting a rotary tool (for example, milling cutter) from the second holding portion 80, it is possible to perform various machining on the end face of the bar W by Z3-axis motion of the second spindle 16 superposed on Z2-axis motion of the second tool rest 20 and by X2-axis motion of the second tool rest 20.

The automatic lathe 10 is further provided with a control unit 106 for controlling the operations of the first and second spindles 14 and 16 and the first and second tool rests 18 and 20 having the above configurations along the above large number of control axes in accordance with an NC program or other machining program. The automatic lathe 10 is configured to be able to simultaneously use as many as three tools 22 selected on the two tool rests 18 and 20, under the control of the control unit 106, so as to automatically machine the bars W and W' held in the front and back spindles 14 and 16, and in particular to be able to simultaneously perform individual motions by interpolation instructed respectively to those three tools 22.

Figure 6:
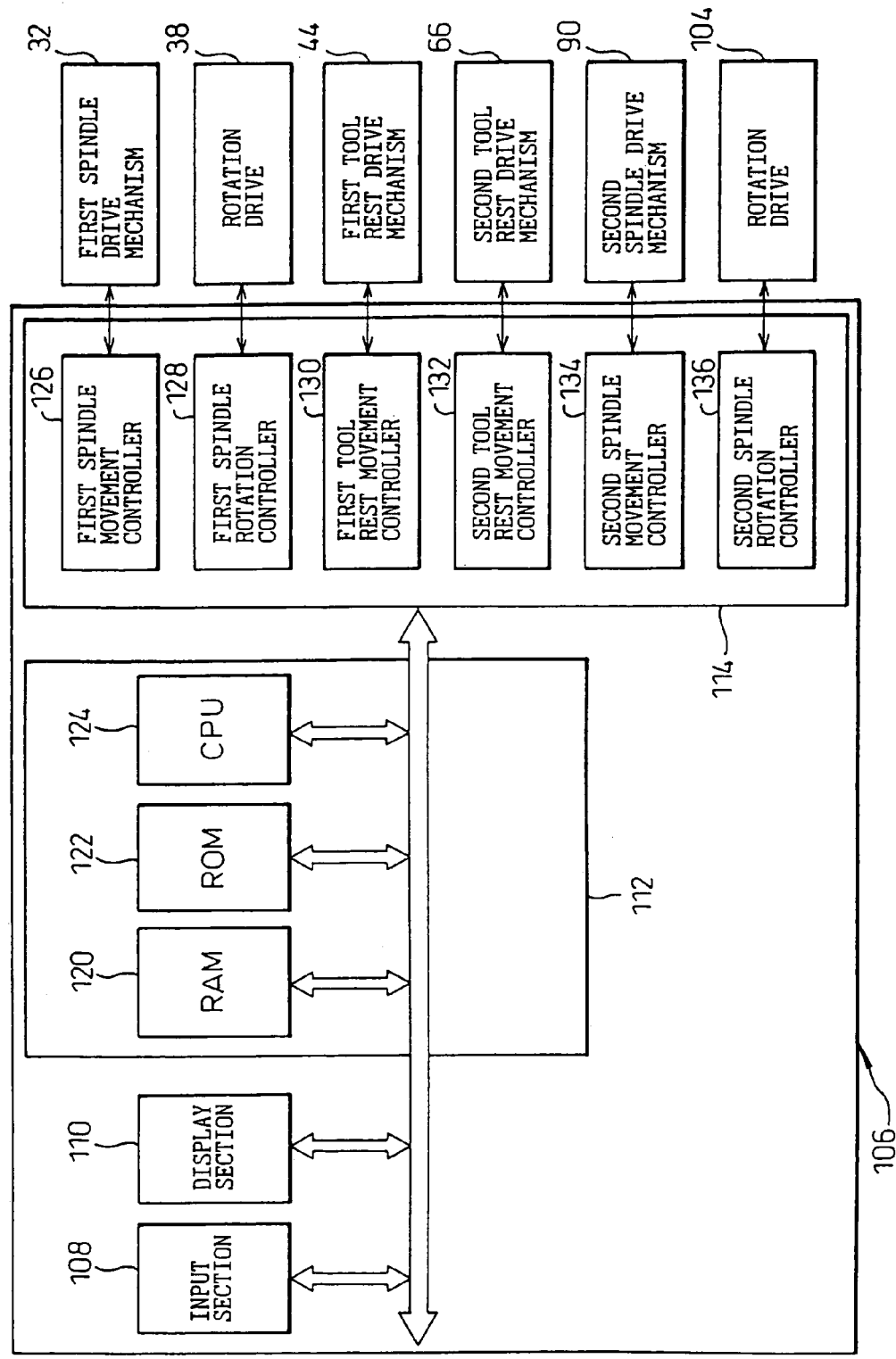
FIG. 6 is a block diagram of the configuration of a control unit of the automatic lathe of FIG. 1.

FIG. 6 shows the configuration of the control unit 106 for performing such diverse automatic machining. The control unit 106 is provided with an input section 108, a display section 110, a process controlling section 112, and a servo controlling section 114. Typically, it is configured as a numerical control (NC) unit. The input section 108 has a keyboard 116 with numeric keys (FIG. 1) provided at the control panel 24. Machining programs relating to the tools 22, including data necessary for control of the operations of the first and second spindles 14 and 16 and first and second tool rests 18 and 20 (selection of tools, shape and dimensions of product, spindle speeds, feed speeds of tools, etc.), is input from the input section 108. The display section 110 has a CRT (cathode ray tube), LCD (liquid crystal display), or other display screen 118 (FIG. 1) provided at the control panel 24, and displays the machining programs input by the input section 108 on the display screen 118 or enables automatic programming with simulation on the display screen 118 by a conversational manner.

The process controlling section 112 has a RAM (random access memory) 120 and ROM (read only memory) 122 forming a storage section and a central processing unit (CPU) 124 forming the processing section. A plurality of machining programs relating to a plurality of tools 22 including various types of data input by the input section 108 are stored in the RAM 120 or ROM 122 under the instruction of the CPU 124. Further, the ROM 122 stores in advance control programs for driving the first and second spindles 14 and 16 and the first and second tool rests 18 and 20. The CPU 124 outputs control commands to the servo controlling section 114 based on the machining programs stored in the RAM 120 or ROM 122 and the control programs stored in the ROM 122.

The servo controlling section 114 is provided with a first spindle movement controller 126, a first spindle rotation controller 128, a first tool rest movement controller 130, a second tool rest movement controller 132, a second spindle movement controller 134, and a second spindle rotation controller 136. The first spindle movement controller 126 operates the Z1-drive 34 (FIG. 2) of the first spindle drive mechanism 32 based on the instructions of the CPU 124 to move the first spindle 14 along with the first spindle stock 26 along the Z1-axis. The first spindle rotation controller 128 operates the rotation drive 38 based on the instructions of the CPU 124 to rotate the first spindle 14 around the C1-axis in the first spindle stock 26. Note that high speed rotation of the first spindle 14 at the time of turning is controlled based on the speed and other data through a not shown separate control circuit.

The first tool rest movement controller 130 simultaneously operates the Y-drive 50 (FIG. 3) and X-drive 54 (FIG. 3) of the first tool rest drive mechanism 44 based on the instructions of the CPU 124 to move the first tool rest 18 along the X1-axis or Y1-axis. The second tool rest movement controller 132 selectively operates the Z2-drive 72 (FIG. 4) and X2-drive 76 (FIG. 4) of the second tool rest drive mechanism 66 based on the instructions of the CPU 124 to move by interpolation the second tool rest 20 in the Z2-axis motion and X2-axis motion.

The second spindle movement controller 134 selectively operates the Z3-drive 96 (FIG. 5) and X3-drive 100 (FIG. 5) of the second spindle drive mechanism 90 based on the instructions of the CPU 124 to move by interpolation the second spindle 16 in the Z3-axis motion and X3-axis motion. The second spindle rotation controller 136 operates the rotation drive 104 based on the instructions of the CPU 124 to rotate the second spindle 16 around the C2-axis in the second spindle stock 86. Note that high speed rotation of the second spindle 16 at the time of turning is controlled based on the speed and other data through a not shown separate control circuit.

In the above control system, the control unit 106 functions to enable the simultaneous performance of first machining work relating to the first spindle 14 (that is, on the bar W held in the first spindle 14) by a desired tool 22 selected at the first tool rest 18, second machining work relating to the first spindle 14 by a desired tool 22 selected from the first row at the second tool rest 20, and third machining work relating to the second spindle 16 (that is, on the bar W' held in the second spindle 16) by a desired tool 22 selected from the second row at the second tool rest 20, by control of the first spindle drive mechanism 32, the first tool rest drive mechanism 44, the second tool rest drive mechanism 66, and the second spindle drive mechanism 90 in such a manner as to link them with each other. Further, the control unit 106 can control the first spindle drive mechanism 32, the first tool rest drive mechanism 44, the second tool rest drive mechanism 66, and the second spindle drive mechanism 90 so as to be able to simultaneously perform a first motion by interpolation (that is, between the Z1-axis and X1-axis or Y1-axis) of a tool 22 selected at the first tool rest 18, a second motion by interpolation (that is, between the Z2-axis and X2-axis) of a tool 22 selected from the first row at the second tool rest 20, and a third motion by interpolation (that is, between the Z3-axis and X3-axis) of a tool 22 selected from the second row at the second tool rest 20.

Figure 7:
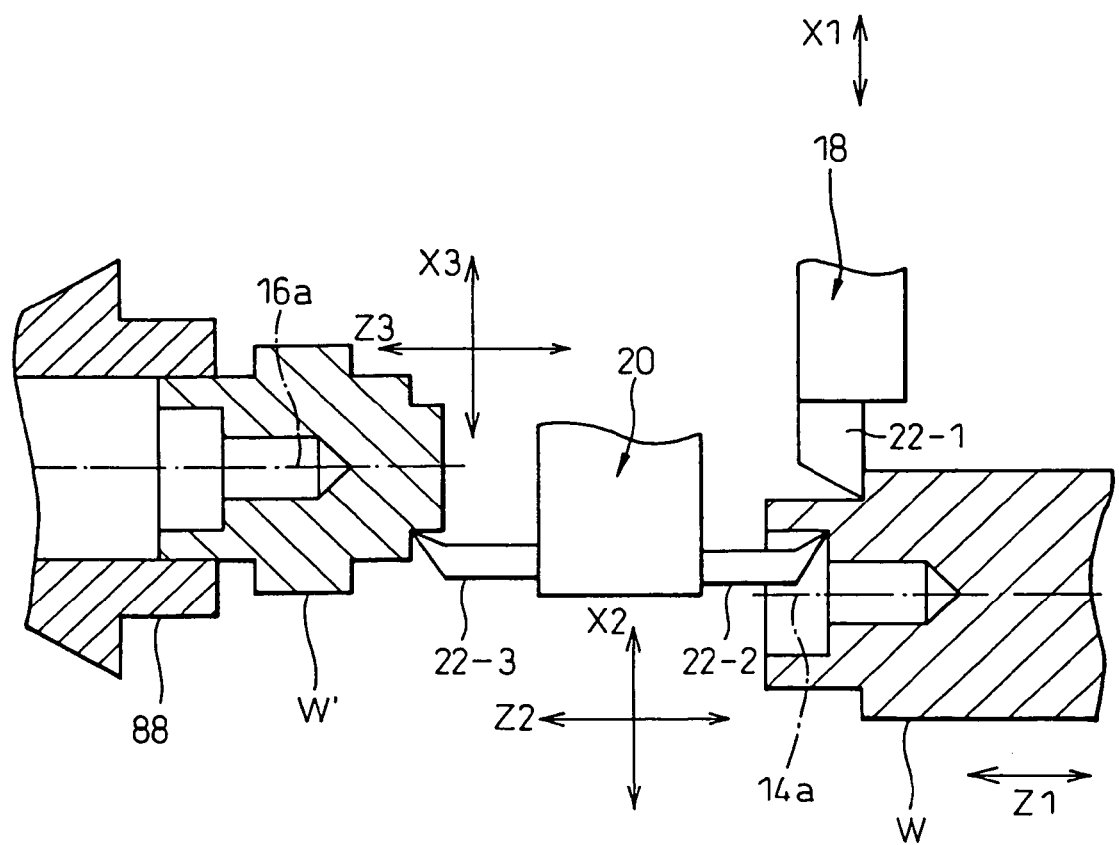
FIG. 7 is a schematic view of an example of simultaneous machining by the first and second tool rests in the automatic lathe of FIG. 1.

An example of the automatic machining by such three-tool simultaneous interpolation will be explained with reference to FIG. 7. In this example, a tool 22-1 mounted at the first tool rest 18 performs outer circumferential turning on the bar W held in the first spindle 14, by motion by interpolation of Z1-axis motion of the first spindle and X1-axis motion of the first tool rest 18, under the operation of the first spindle drive mechanism 32 and the first tool rest drive mechanism 44. Simultaneously, a tool 22-2 mounted at the first row of the second tool rest 20 performs boring on the bar W held in the first spindle 14, by motion by interpolation of Z2-axis motion and X2-axis motion of the second tool rest 20 under the operation of the second tool rest drive mechanism 66. Further, simultaneously, a tool 22-3 mounted in the second row of the second tool rest 20 performs outer circumferential turning on the bar W' held in the second spindle 16, by motion by interpolation of Z3-axis motion and X3-axis motion of the second spindle 16 under the operation of the second spindle drive mechanism 90.

Here, the control unit 106 controls the second tool rest drive mechanism 66 along a composite Z-axis defined by superposing the Z2-axis to which the second tool rest 20 belongs (that is, the Z2-axis for controlling the operation of the second tool rest 20) on the Z1-axis to which the first spindle 14 belongs (that is, the Z1-axis for controlling the operation of the first spindle 14), on the basis of the machining program for the tool 22-1 and the machining program for the tool 22-2, both input at the input section 108, and thereby moves the second tool rest 20 by superposition in the Z-axis direction. Similarly, the control unit 106 controls the second spindle drive mechanism 90 along a composite Z-axis defined by superposing the Z3-axis to which the second spindle 16 belongs (that is, the Z3-axis for controlling the operation of the second spindle 16) on the Z2-axis to which the second tool rest 20 belongs and a composite X-axis defined by superposing the X3-axis to which the second spindle 16 belongs on the X2-axis to which the second tool rest 20 belongs, on the basis of the machining program for the tool 22-2 and the machining program for the tool 22-3, both input at the input unit 108, and thereby moves the second spindle 16 by superposition in the Z-axis direction and moves it by superposition in the X-axis direction.

The automatic lathe 10 having this configuration can realize diverse tool operations including simultaneous interpolation of three tools by just the provision of the two tool rests 18 and 20 for the two front and back spindles 14 and 16, and enables complicated and diverse automatic machining of the bars w and W' held in the two spindles 14 and 16 in short time. Further, since it mounts the tools 22 for performing machining relating to both of the first spindle 14 and second spindle 16 in the second tool rest 20 operating independently along two rectangular axes from the first tool rest 18 and the second spindle 16 can operate superposed on the rectangular two-axis operation of the second tool rest 20, not only is it possible to eliminate a third tool rest exclusively for the second spindle, but also it is possible to cut down the amount of movement along the X3-axis of the second spindle 16 when machining the bar W' and, as a result, the effect is exhibited that the overall dimensions of the automatic lathe 10 can be reduced.

Figure 8:
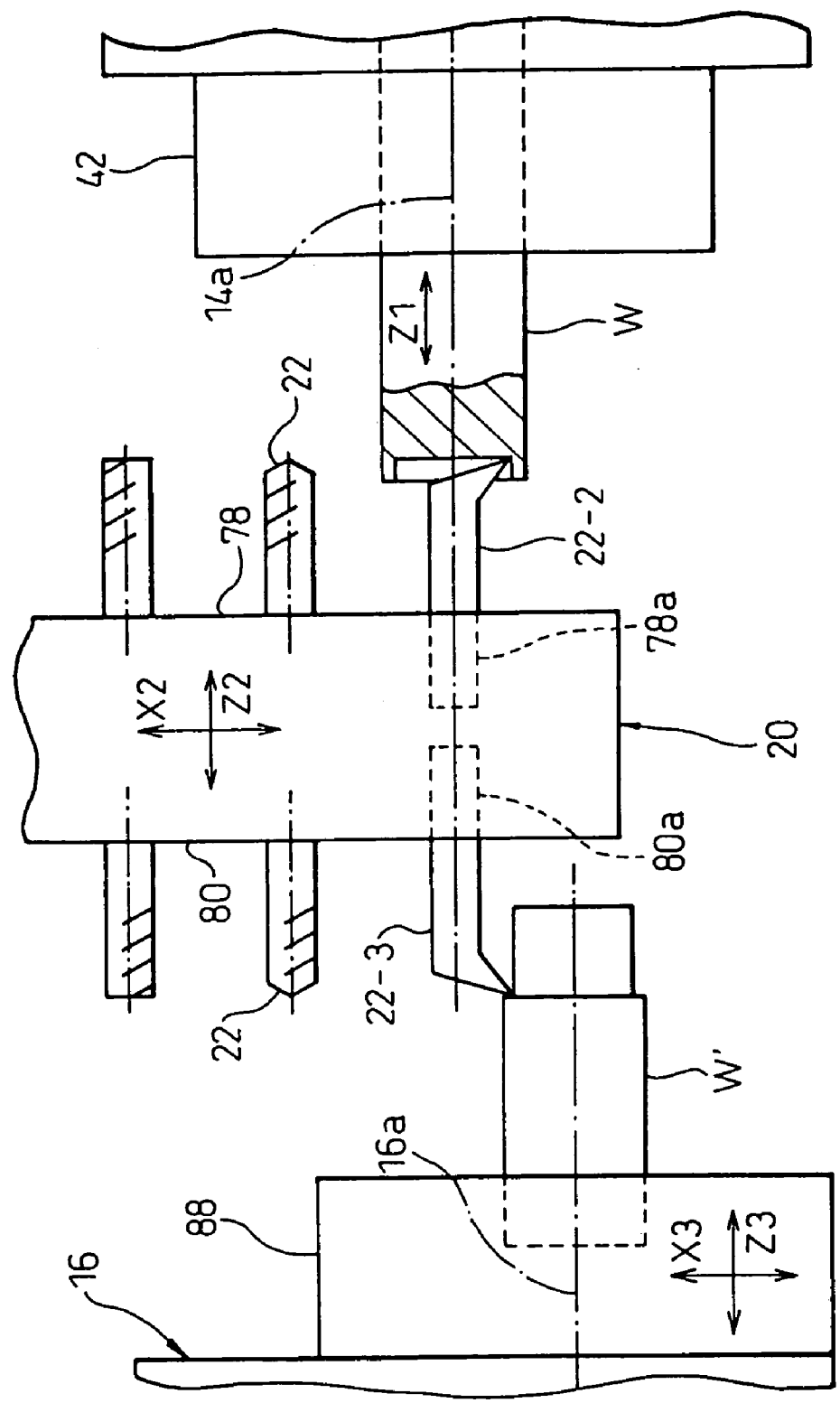
FIG. 8 is a schematic view of simultaneous machining similar to FIG. 7 by the second tool rest in the automatic lathe of FIG. 1 shown from another direction.

Note that the tools (or single point tools) 22-2 and 22-3 used in the above example of machining are preferably mounted at the outermost end positions (or mount holes) 78a and 80a of the first and second holding portions 78 and 80 of the second tool rest 20 as shown in FIG. 8 to prevent interference between the other tools 22 mounted adjacent to them and the bars W and W', since the tools 22-2 and 22-3 and the bars W and W' move relatively in the X2-axis direction of the second tool rest 20. However, when the bars W and W' have outside diameter dimensions of an extent not interfering with the tools 22 adjacent to the used tools 22-2 and 22-3 or when no adjacent tools 22 are mounted, it is possible to mount them at other desired locations (or mount holes).

Figure 9:
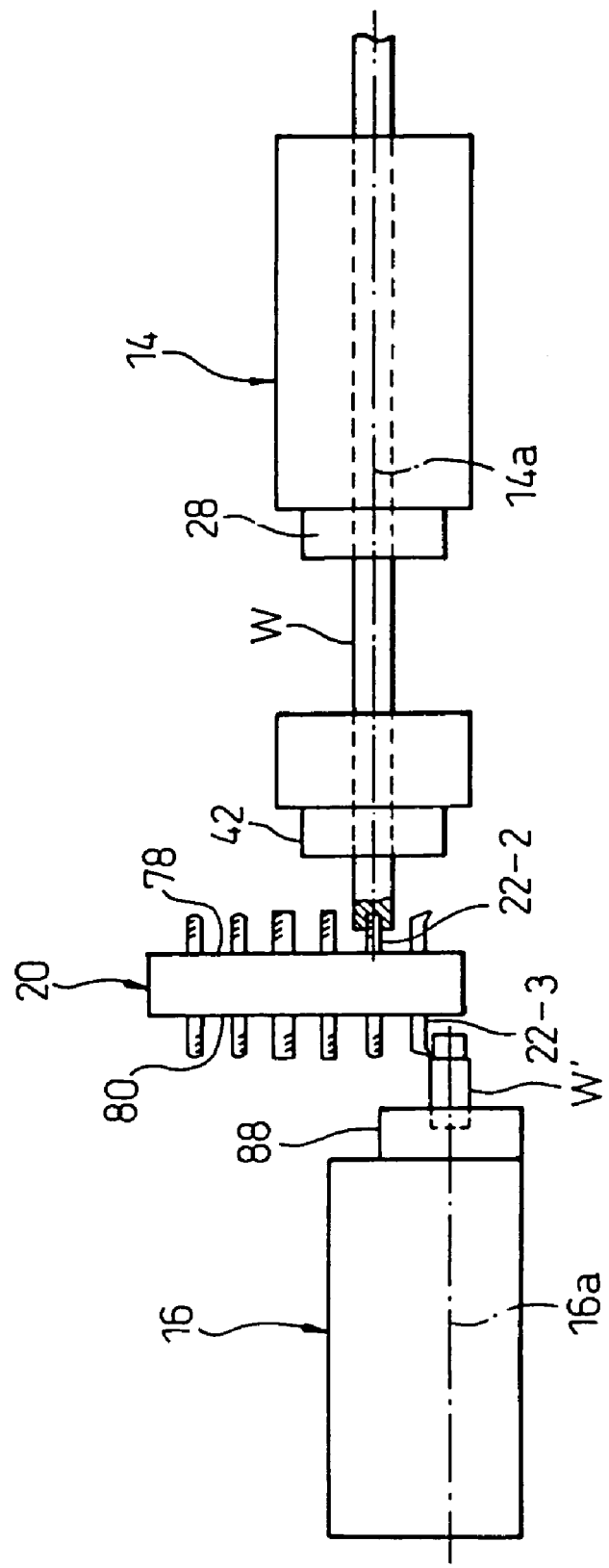
FIG. 9 is a schematic view of another example of simultaneous machining by the second tool rest in the automatic lathe of FIG. 1.
Figure 10:
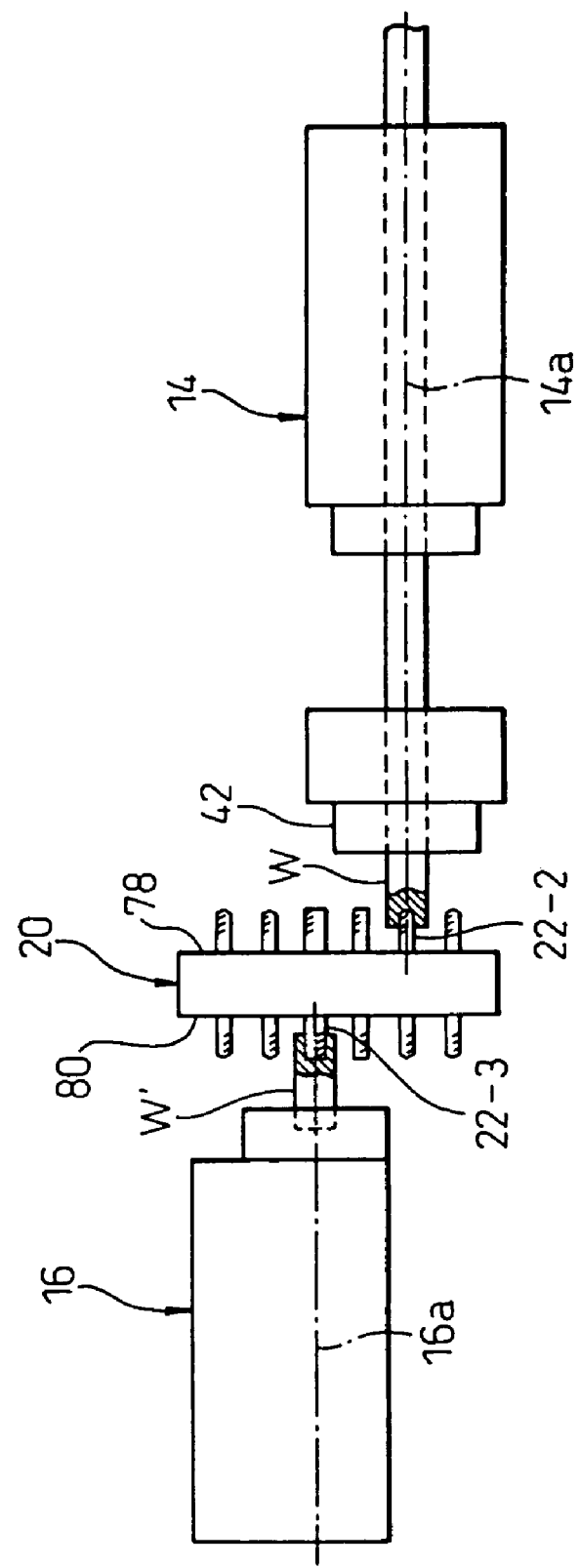
FIG. 10 is a schematic view of still another example of simultaneous machining by the second tool rest in the automatic lathe of FIG. 1.

Further, as shown in FIG. 8, since the second tool rest 20 and the second spindle 16 can move in the parallel X2-axis direction and X3-axis direction by independent drive mechanisms, even in a state where the axis of rotation 14a of the first spindle 14 and the axis of rotation 16a of the second spindle 16 are offset from each other, it is possible to freely simultaneously machine two bars W and W'. Therefore, as shown in FIG. 9 and FIG. 10 as another example of machining, it is possible to freely select and use the tools 22-2 and 22-3, not coaxially arranged at the first holding portion 78 and the second holding portion 80 of the second tool rest 20, so as to perform simultaneous machining for the first and second spindles 14 and 16. Further, since the second tool rest 20 has a gang structure, the time required for tool selection is shorter than with a turret tool rest and there is no concern over canceling out the effect of shortening the machining time due to the simultaneous interpolation.

Further, since tool selection can be performed freely and quickly, during performing of, for example, machining work requiring a relatively long time on the bar W at the first spindle 14 side by a tool 22 mounted in the first holding portion 78 of the second tool rest 20, it is possible to sequentially select desired tools 22 mounted in the second holding portion 80 of the second tool rest 20 and perform machining work (for example, tapping) which can be performed in a relatively short time on a bar W' at the second spindle 16 side. For example, when tapping the bar W' at the second spindle 16 side, it is possible to move the second spindle 16 in the X3-axis and Z3-axis directions and sequentially perform a preparation of a rough hole, a tool exchange and a tapping by a tap hole preparing drill and a tapping tool mounted in the second holding portion 80 of the second tool rest 20. In this way, according to the automatic lathe 10, the degree of freedom of selection of the tools 22 is improved and it is possible to extremely quickly machine bars W and W' into diverse shapes.

Figure 11:
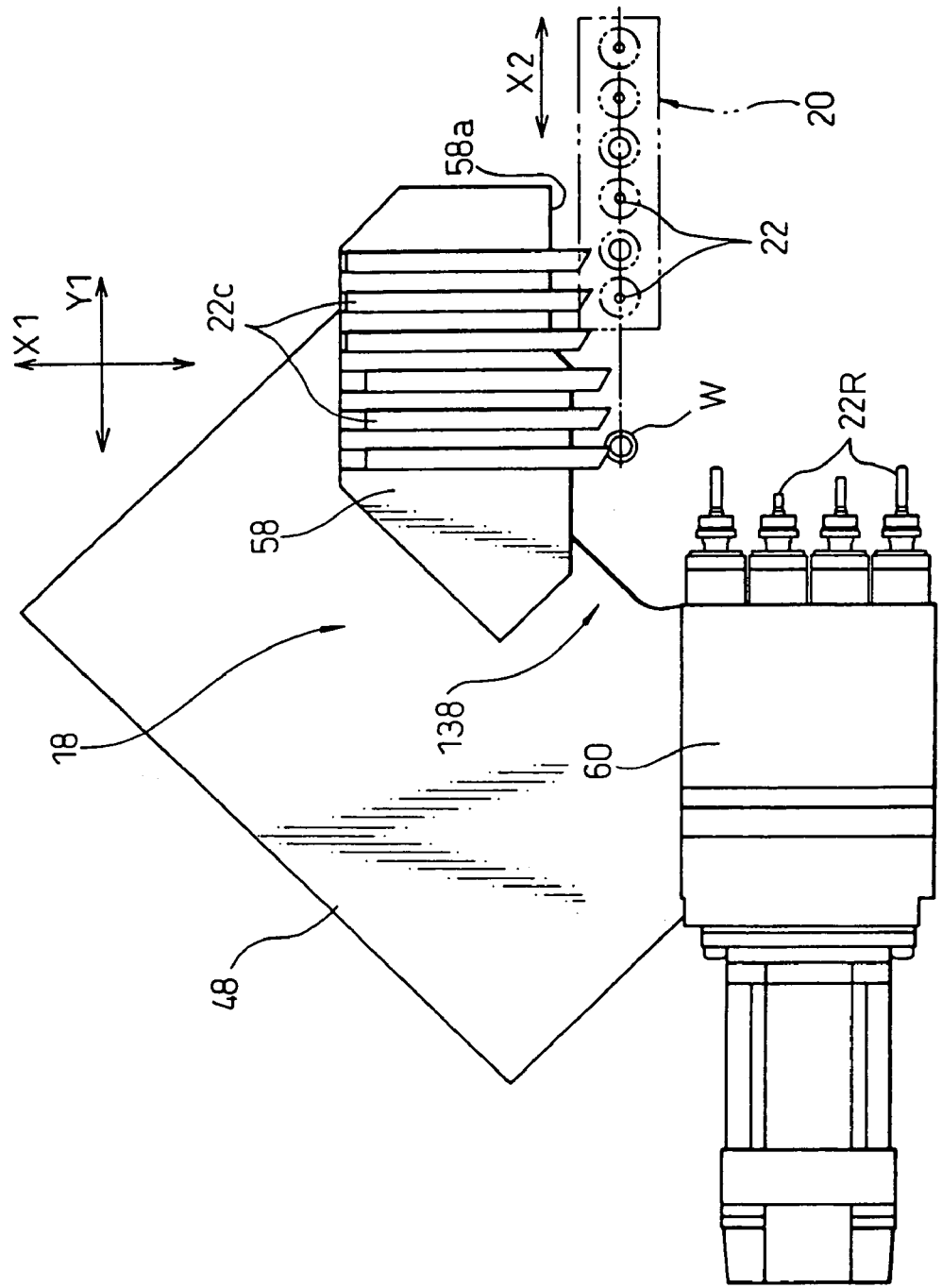
FIG. 11 is an enlarged front view of the first tool rest of the automatic lathe of FIG. 1.

In the automatic lathe 10, when performing simultaneous machining on the bar w held in the first spindle 14 by a tool 22 on the first tool rest 18 and a tool 22 on the second tool rest 20, interference may be caused between the tools 22 arranged in parallel on the two tool rests 18 and 20. To eliminate this concern, the first tool rest 18, as shown enlarged in FIG. 11, is configured so that the first holding portion 58 formed as a gang tool rest can position the noses of tools at a plurality of positions mutually shifted in the longitudinal direction of the tools. In the illustration, the noses of the three right side single point tools 22C among the six tools 22C mounted at the first holding portion 58 are arranged at positions farther from the X2-axis direction path of movement of the tools 22 arranged in the first row on the second tool rest 20, compared with the noses of the three left side single point tools 22C.

To realize such a tool arrangement, the first holding portion 58 of the first tool rest 18 has an end face 58a at the tool nose side formed into a two-step shape having a step difference at the center of the location of mounting the six tools. Due to this, all of the single point tools 22C can be arranged with noses at positions an approximately same distance from the end face 58a. Further, the first tool rest 18 is provided with a recess 138 for avoiding contact with the tools 22 arranged in the first row on the second tool rest 20, between the first holding portion 58 and second holding portion 60 secured to the X-slide 48.

According to this configuration, while machining the bar W by only the single point tools 22C mounted in the first holding portion 58 of the first tool rest 18, as illustrated, the retracted position of the second tool rest 20 can be set to a position close to the three right side single point tools 22C so long as the tools 22 arranged in the first row do not interfere with the three left side tools 22C on the first holding portion 58. Therefore, the retraction distance of the second tool rest 20 can be shortened and as a result the time required for tool selection at the second tool rest 20 can be further cut.

Figure 12:
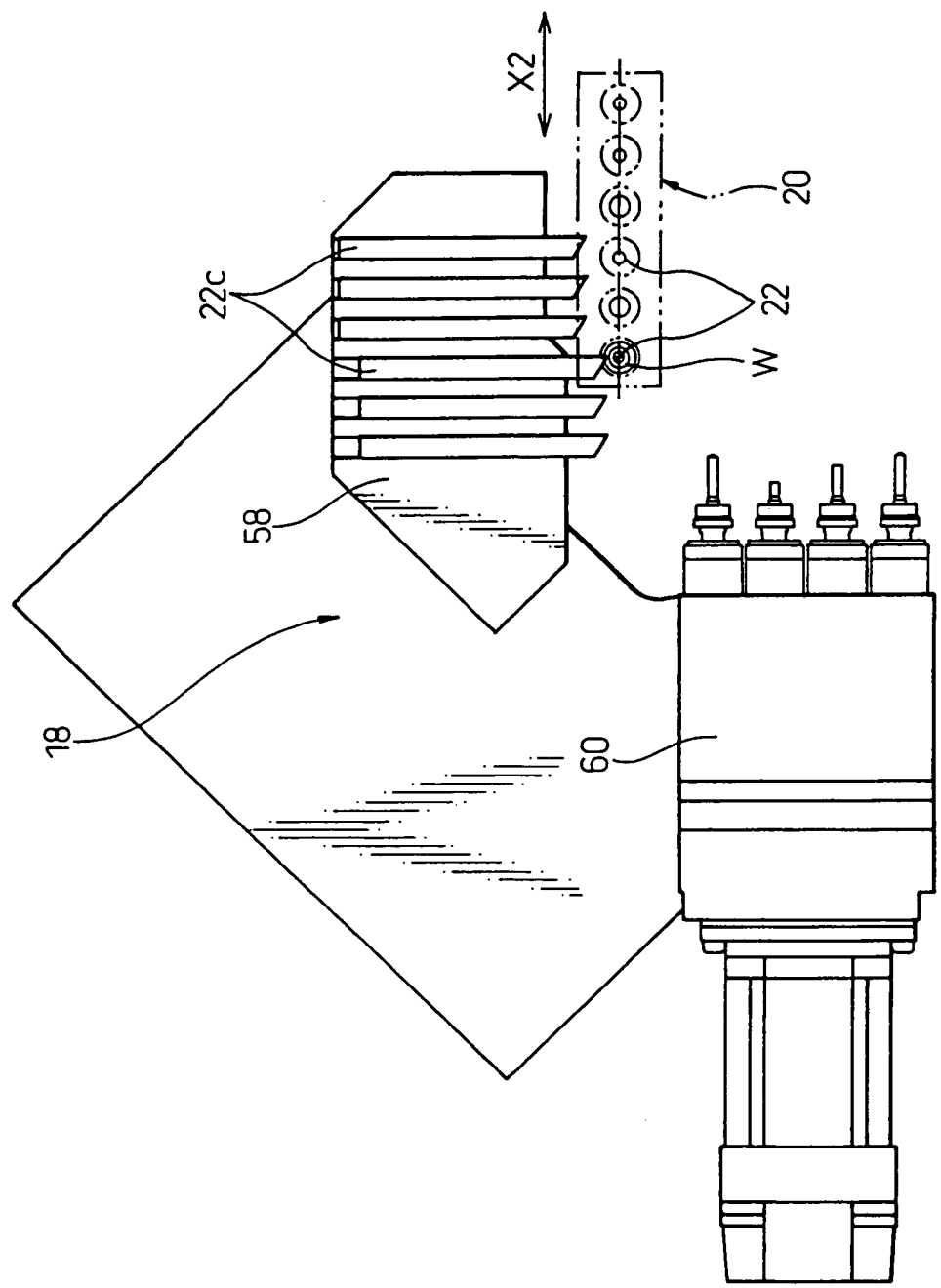
FIG. 12 is a schematic view of another example of simultaneous machining by the first and second tool rests in the automatic lathe of FIG. 1.
Figure 13:
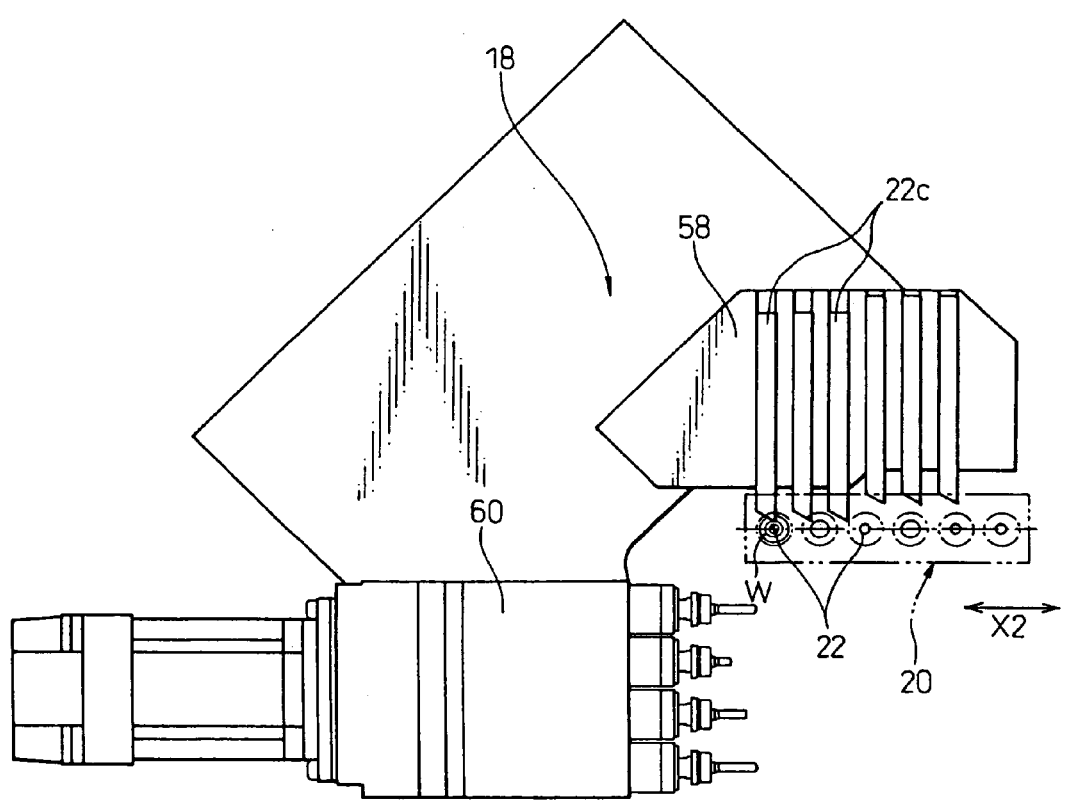
FIG. 13 is a schematic view of still another example of simultaneous machining by the first and second tool rests in the automatic lathe of FIG. 1.

Further, as shown in FIG. 12, when simultaneously machining a bar w by a single point tool 22C mounted in the first holding portion 58 of the first tool rest 18 and a tool 22 mounted in the first row of the second tool rest 20, it is possible to avoid interference between the other single point tools 22C on the first holding portion 58 and the other tools 22 on the second tool rest 20, by setting the mounting positions of the respective tools so as to use the third tool 22C, from the left end in the illustration, of the first holding portion 58 and the left end tool 22, in the illustration, of the second tool rest 20. Alternatively, as shown in FIG. 13, even when simultaneously machining by using the left end single point tool 22C, in the illustration, of the first holding portion 58 of the first tool rest 18 and the left end tool 22, in the illustration, of the second tool rest 20, it is sufficient to suitably set the intervals of arrangement and tool diameter dimensions of the tools 22 on the second tool rest 20 so as not to interfere with the other single point tools 22C on the first holding portion 58.

Figure 14:
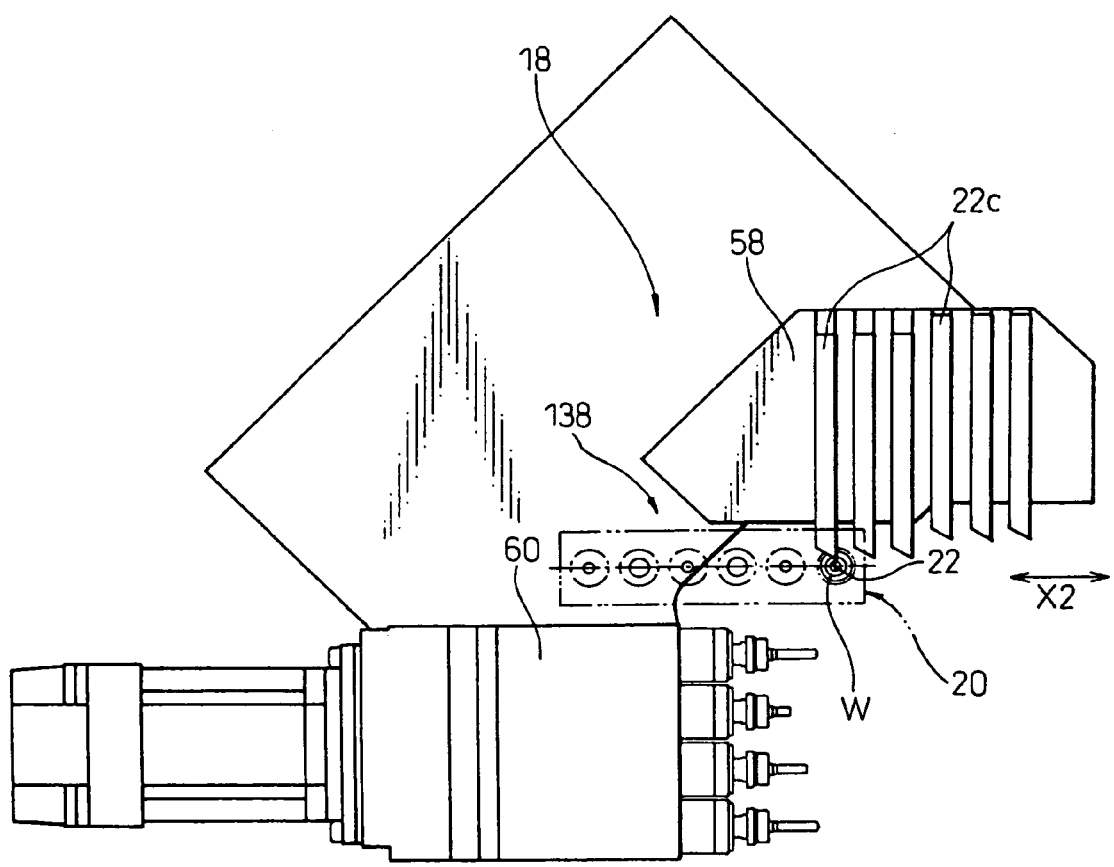
FIG. 14 is a schematic view of still another example of simultaneous machining by the first and second tool rests in the automatic lathe of FIG. 1.

Further, as shown in FIG. 14, when simultaneously machining a bar W using the left end single point tool 22C, in the illustration, of the first holding portion 58 of the first tool rest 18 and the right end tool 22, in the illustration, of the second tool rest 20, the other tools 22 on the second tool rest 20 enter the recess 138 provided in the first tool rest 18. As a result, interference between the first tool rest 18 as well as X-slide 48 and the tools 22 on the second tool rest 20 is avoided.

While preferred embodiments of the present invention were explained above, the present invention is not limited to the above embodiments and can be changed and modified in various ways within the scope of the claims.

The invention claimed is:

1. An automatically operated lathe comprising:
   a lathe bed;
   a first spindle installed on said lathe bed, including a first axis of rotation, and movable in an axial direction of said first axis of rotation;
   a first tool rest installed on said lathe bed, capable of holding a plurality of tools in a parallel arrangement, and movable in a direction perpendicular to said first axis of rotation;

a second tool rest installed on said lathe bed, capable of holding a plurality of tools in parallel arrangements along a first row and a second row exhibiting mutually different nose orientations, and movable in an axial direction of said first axis of rotation and a direction perpendicular to said first axis of rotation; and a second spindle installed on said lathe bed, including a second axis of rotation parallel to said first axis of rotation, capable of being located facing said first spindle, and movable in an axial direction of said second axis of rotation and a direction perpendicular to said second axis of rotation;

wherein said first spindle, said first tool rest, said second tool rest, and said second spindle are selectively moved in movable directions thereof to machine different materials to be machined held in said first spindle and said second spindle; and wherein said first tool rest is provided with a recess for avoiding contact with a plurality of tools disposed in the first row of said second tool rest.

* * * * *